United States Patent [19]

Dressel et al.

[11] Patent Number: 4,567,294

[45] Date of Patent: Jan. 28, 1986

[54] PREPARATION OF AMMONIUM CARBAMATE

[75] Inventors: Manfred Dressel, Maxdorf; Heinrich Eberle, Ludwigshafen; Willi Ripperger, Frankenthal; Wolfgang Ruehenbeck, Birkenau; Werner Zwick, Ludwigshafen, all of Fed. Rep. of Germany

[73] Assignee: BASF Aktiengesellschaft, Fed. Rep. of Germany

[21] Appl. No.: 684,063

[22] Filed: Dec. 20, 1984

[30] Foreign Application Priority Data

Dec. 23, 1983 [DE] Fed. Rep. of Germany ....... 3346719

[51] Int. Cl.$^4$ ........................................... C07C 125/02
[52] U.S. Cl. ..................................................... 562/555
[58] Field of Search ......................................... 562/555

[56] References Cited

U.S. PATENT DOCUMENTS 2,194,082  3/1940  Booth .................................. 562/555
4,420,635 12/1983  Washington ........................ 562/555

FOREIGN PATENT DOCUMENTS 815039  8/1951  Fed. Rep. of Germany .
 827943 12/1951  Fed. Rep. of Germany .
1097430  7/1961  Fed. Rep. of Germany .

OTHER PUBLICATIONS

Ulmann, Encyclopedia verlag Chemie, 4th Edition, vol. 7, p. 526.

Primary Examiner—Michael L. Shippen
Attorney, Agent, or Firm—Keil & Weinkauf

[57] ABSTRACT

In the preparation of ammonium carbamate by reacting ammonia with carbon dioxide, the reactants are introduced into a layer of ammonium carbamate which is kept in the fluidized state by gaseous ammonia or carbon dioxide. The temperature is kept below 25° C. by removing the heat of reaction.

4 Claims, 1 Drawing Figure

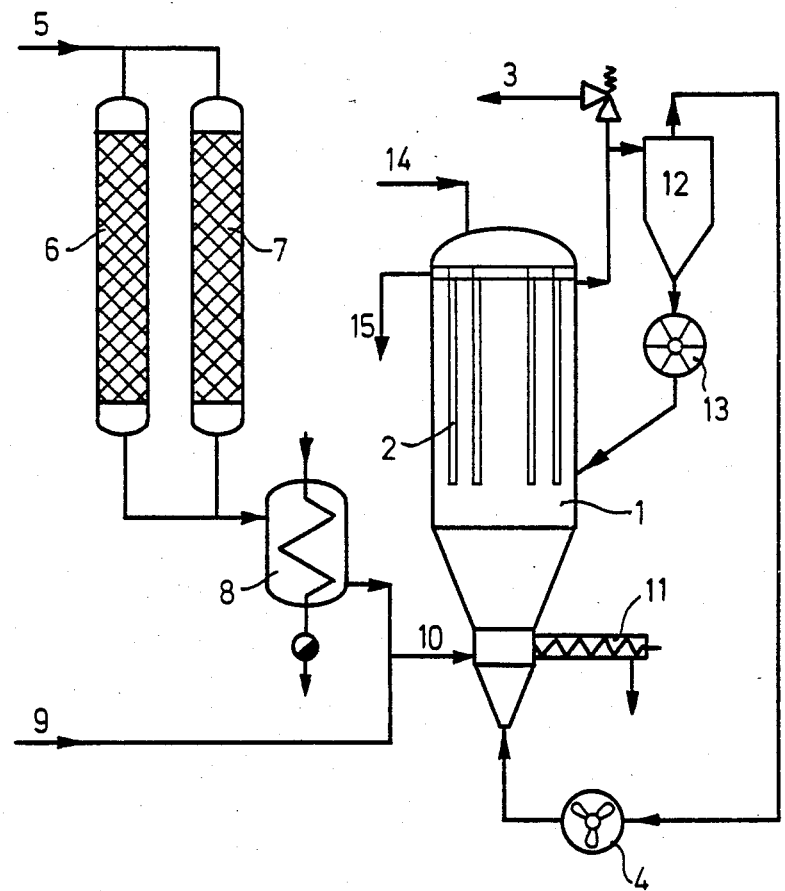

PREPARATION OF AMMONIUM CARBAMATE

Ammonium carbamate is produced industrially by two processes. In one process, which is carried out in aqueous solution, the ammonium carbamate is obtained from a supersaturated aqueous solution by crystallization as a result of cooling. The solution must be strongly ammoniacal ($NH_3$ content above 30% by weight) and the crystallization temperature should be above 30° C. in order to prevent finely crystalline $NH_4COONH_2$ from separating out (Ullmann, 4th edition, Vol. 7, page 526). However, this process is restricted to the preparation of hydrated carbamate. The ammonium carbamate cannot be dried completely because it is more volatile than water. The conversion of $NH_3$ and $CO_2$ to ammonium carbamate is only about 60%. Furthermore, this process has the disadvantage that the ammonium carbamate obtained is not pure but contaminated with ammonium bicarbonate and ammonium carbonate.

The other process is carried out in the absence of water, the two gases, ammonia and carbon dioxide, being passed through vertical tubes whose walls are cooled. Ammonium carbamate is deposited on the cooled tube walls, in the form of a cohesive solid. Heating the walls causes the ammonium carbamate to slide out of the reaction space (DE-C No. 827 943 and DE-C No. 815 039). Although this process gives a yield as high as 70% and the resulting carbamate is virtually completely anhydrous and very pure, the poor thermal conductivity of the salt necessitates large cooling surfaces. Another critical disadvantage of this process is that the carbamate is obtained in large pieces (for example in the form of hollow cylinders as long as 8 m and with an external diameter of 0.2 m) and has to be comminuted mechanically before being used further. Because of the low decomposition temperature of the ammonium carbamate, substantial losses occur during comminution, and the ammonia which escapes during this procedure necessitates technically very complicated apparatus in order to avoid pollution of the atmosphere.

According to DE-C No. 1 097 430, these disadvantages are overcome by a method in which liquid carbon dioxide and liquid ammonia are let down into a closed space through a mixing nozzle, one of the reactants being employed in excess. However, this process has the disadvantage that the carbamate powder obtained consists of very fine crystals (diameter less than 0.001 mm), and the snow-like crystals are difficult to handle.

All of these processes have the further disadvantage that they cannot be operated continuously.

It is an object of the present invention to provide a process for the preparation of anhydrous ammonium carbamate by reacting ammonia and carbon dioxide in the gas phase, which process can be operated continuously and permits the preparation of a product having a defined particle size range.

We have found that this object is achieved if the reactants are introduced into a layer of ammonium carbamate which is kept in the fluidized state by means of gaseous ammonia or carbon dioxide, and the temperature is kept below 25° C. by removing the heat of reaction.

Either carbon dioxide or ammonia is used as the fluidizing gas, and is circulated. A gas which predominantly consists of carbon dioxide is preferably used as the fluidizing gas, but the latter can of course also contain inert gases.

When a plant operated according to the novel process is taken into operation, ammonium carbamate having a particle size range of from 0.1 to 1 mm can be used as the fluidized material.

The ammonia required for the reaction can be introduced into the fluidized bed, for example, in gaseous form. However, it has proven advantageous if the ammonia required for the reaction is not introduced as pure ammonia but mixed with the stoichiometric amount of carbon dioxide before the addition, and this gas mixture heated to about 45° C., in order to avoid premature deposition of carbamate in the feed lines upstream of the fluidized bed.

The temperature in the fluidized bed is kept below 25° C. in order to avoid decomposition of the carbamate. The optimum reaction temperature from an economic point of view has proven to be from 18° L to 25° C. The reaction can of course also be carried out at lower temperatures, but this necessitates expensive insulation of the reactor and special coolants.

The heat of reaction and heat of desublimation produced in accordance with the reaction

$$2\ NH_3 + CO_2 \rightarrow NH_4COONH_2\ (168\ kJ/kmol)$$

can be conducted away indirectly or directly by means of evaporative cooling. Indirect removal of heat is effected via heat exchangers which are incorporated in the fluidized bed and whose cooling surfaces are advantageously such that the temperature difference between the fluidized bed and the cooling surface does not exceed 10° C. As a result, caking of product on the cooling surfaces is completely avoided.

For direct removal of heat by evaporative cooling, it has proven advantageous to spray the required amount of either liquid ammonia or liquid carbon dioxide continuously into the fluidized bed. Preferably, the gas which is metered in as a liquid is that which is used as the fluidizing gas.

The process can be carried out under atmospheric pressure or superatmospheric pressure of not more than 10 bar absolute.

The novel process may be illustrated with reference to the FIGURE:

The fluidized-bed reactor 1 is filled with finely crystalline ammonium carbamate in an amount such that the heat exchangers 2 are completely immersed in the fluidized bed when the fluidized state is achieved. The air is displaced from the reactor through the pressure-relief line 3, preferably with $CO_2$. Fluidization of the bed is effected via the fan 4 for the circulating gas, and the fluidized bed is brought to 18°–25° C. by means of the internal heat exchangers. $CO_2$ gas is passed through line 5 into the drying towers 6 and 7 which are filled with alumina and operated alternately; it is dried in these towers and then heated in the pre-heater 8 to a temperature such that, after the addition of the stoichiometric amount of $NH_3$, which is fed through line 9, the temperature of the reaction gas mixture is 45° C. The reaction mixture is fed to the lower part of the reactor through line 10, and is introduced through a nozzle. Cooling water is fed to the heat exchanger through line 14, and taken off through line 15.

The heat of reaction is conducted away to the cooling medium via the internal heat exchangers, and care should be taken to ensure that the temperature in the fluidized bed does not exceed 25° C. in order to achieve complete desublimation of the $NH_3+CO_2$ gas mixture on the crystals initially taken.

The carbamate crystals formed are removed continuously via the discharge screw 11 at the lowest point of the fluidized bed. In the main, the relatively coarse crystals can be separated off in this way.

The fine particles discharged with the fluidizing gas are separated off in the dust precipitator 12, and are recycled to the fluidized bed via the star wheel 13.

EXAMPLE 1

Preparation of ammonium carbamate using $CO_2$ as the fluidizing gas (indirect cooling)

2,800 g of ammonium carbamate are introduced into a fluidized-bed reactor having a diameter of 8 cm and a length of 1 m. The salt is kept constantly fluidized by means of the fan for the circulating gas (2,000 l/h, composition: 4 vol. % of $NH_3$, 90 vol. % of $CO_2$ and 6 vol. % of inert gases) and maintained at 25° C. at the cooling surfaces. At the same time, 136 g/h of $NH_3$ gas and 204 g/h of $CO_2$ are premixed, and the mixture introduced into the reactor through a nozzle.

With the level in the reactor being kept constant, 308 g/h of ammonium carbamate having a bulk density of 720 g/l and an $NH_3$ content of 43.5% by weight are obtained. Sieve analysis of this product gives the following values:

| Sieve analysis | |
|---|---|
| + [mm] | [%] |
| 0.1–0.2 | 5.5 |
| 0.2–0.5 | 75.8 |
| 0.5–1 | 18.7 |

The yield is 98.72%, based on the $NH_3$ employed. The excess $CO_2$ gas metered in replaces the losses through leakage.

EXAMPLE 2

Preparation of ammonium carbamate using $NH_3$ as the fluidizing gas (indirect cooling)

2,800 g of ammonium carbamate are introduced into the fluidized-bed reactor and kept constantly fluidized by means of 2,000 l/h of circulating gas (composition: 86 vol. % of $NH_3$, 9 vol. % of $CO_2$ and 5 vol. % of inert gases). The ammonium carbamate is maintained at 25° C. at the cooling surfaces. At the same time, 185 g/h of $CO_2$ gas and 145 g/h of $NH_3$ gas are premixed, and the mixture is introduced into the reactor through a nozzle.

With the level in the reactor being kept constant, 312 g/h of ammonium carbamate having a bulk density of 740 g/l and an $NH_3$ content of 43.5% by weight are obtained. The yield is 97.8%, based on the $CO_2$ gas employed. Sieve analysis indicates the following distribution:

| Sieve analysis | |
|---|---|
| [mm] | [%] |
| 0.1–0.2 | 10.5 |
| 0.2–0.5 | 80.0 |
| 0.5–1 | 9.5 |

Losses through leakage are replaced by the excess $NH_3$.

EXAMPLE 3

Preparation of ammonium carbamate using $NH_3$ as the fluidizing gas (direct cooling by vaporization of liquid $NH_3$)

2,800 g of ammonium carbamate are introduced into the fluidized-bed reactor, and the initially taken salt is kept constantly fluidized by means of 2,000 l/h of circulating gas (composition: 80 vol. % of $NH_3$, 14 vol. % of $CO_2$ and 6 vol. % of inert gases).

In contrast to Examples 1 and 2, the reaction gases are not premixed but are introduced separately through a nozzle.

Liquid $NH_3$: 145 g/h;
Gaseous $CO_2$: 180 g/h.

The heat required to vaporize the $NH_3$ fed in as a liquid is supplied by the heat of reaction in the formation of the ammonium carbamate. The remaining heat of reaction is conducted away via the cooling surfaces incorporated, so that the fluidized bed is kept at 25° C.

With the level in the reactor being kept constant, 316 g/h of ammonium carbamate are separated off. The product has a bulk density of 780 g/l and gives the following sieve analysis:

| Sieve analysis | |
|---|---|
| [mm] | [%] |
| 0.1–0.2 | 28.5 |
| 0.2–0.5 | 67.0 |
| 0.5–1 | 4.5 |

The yield is 95.1%, based on the $NH_3$ employed.

We claim:

1. A process for the preparation of ammonium carbamate by reacting ammonia with carbon dioxide, wherein the reactants are introduced into a layer of ammonium carbamate which is kept in the fluidized state by means of gaseous ammonia or carbon dioxide, and the temperature is kept below 25° C. by cooling.

2. The process of claim 1, wherein cooling is effected indirectly, with the proviso that the temperature difference between the ammonium carbamate kept in the fluidized state and the surface of the cooler is not allowed to exceed 10° C.

3. The process of claim 1, wherein cooling is effected by a direct method, by introducing one or both of the reactants in liquefied form.

4. The process of claim 1, wherein the reaction is carried out under an absolute pressure of from 1 to 10 bar.

* * * * *